Sept. 29, 1953   F. C. BIGGERT, JR   2,653,662
FLYING SHEAR
Filed July 25, 1949   6 Sheets-Sheet 1

INVENTOR.
FLORENCE C. BIGGERT, JR.
BY J. E. Dickman
his atty

Sept. 29, 1953

F. C. BIGGERT, JR 2,653,662

FLYING SHEAR

Filed July 25, 1949

INVENTOR.
FLORENCE C. BIGGERT, JR.
BY J.E. Dickinson
his atty

Sept. 29, 1953     F. C. BIGGERT, JR     2,653,662
FLYING SHEAR

Filed July 25, 1949     6 Sheets-Sheet 3

INVENTOR.
FLORENCE C. BIGGERT, JR.
BY J. E. Dickman
his atty

Sept. 29, 1953  F. C. BIGGERT, JR  2,653,662
FLYING SHEAR
Filed July 25, 1949  6 Sheets-Sheet 6

INVENTOR.
FLORENCE C. BIGGERT, JR.
BY J.E. Dickman
his atty

Patented Sept. 29, 1953

2,653,662

UNITED STATES PATENT OFFICE 2,653,662

FLYING SHEAR

Florence C. Biggert, Jr., Pittsburgh, Pa., assignor to United Engineering & Foundry Company, Pittsburgh, Pa., a corporation of Pennsylvania Application July 25, 1949, Serial No. 106,535

2 Claims. (Cl. 164—49)

1

This invention relates to apparatus for cutting into pre-determined lengths continuous moving strip material and, in particular, relates to an improved shear frame speed control device adapted to be incorporated into a flying shear of the reciprocating type for insuring synchronization of movement of the shearing elements thereof with that of the continuous moving strip material at the instant a cut is made regardless of the lengths into which the strip is being cut.

Speed control apparatus usually incorporated in reciprocating frame type flying shears of the nature herein shown and described, while adapted satisfactorily to impose upon the shear the speeds which may be desired for cutting moving material into certain required lengths, are inherently defective to the extent that usually when the speed is to be modified, movement of the shear must be interrupted for the length of time necessary for accomplishing the desired adjustment. Thus, to avoid having a great unequal length of strip pass through the shear during an adjusting period, forward movement of the strip must also be interrupted, thus materially affecting production of the shearing line. With apparatus embodying the features of the invention herein disclosed, however, it is possible to adjust readily the oscillating speed of the shear knives without stopping the shear or interrupting movement of the stock passing therethrough.

With the foregoing in mind, the objects of this invention are to provide apparatus which permits the cutting into any number of pre-determined lengths continuous moving strip material; to provide shearing apparatus adapted to be moved in the direction and at the same longitudinal speed of rapidly moving strip material at the instant a cut is made; to provide a speed control element for a flying shear capable of adjustment while the shear is in operation, and to provide a rugged speed adjusting control element for a flying shear which, under all conditions of operation, is positive and accurate of adjustment and control.

These objects, as well as the various other novel features and advantages of this invention, will become apparent from a reading of the following description and accompanying drawings of which:

Figure 2:
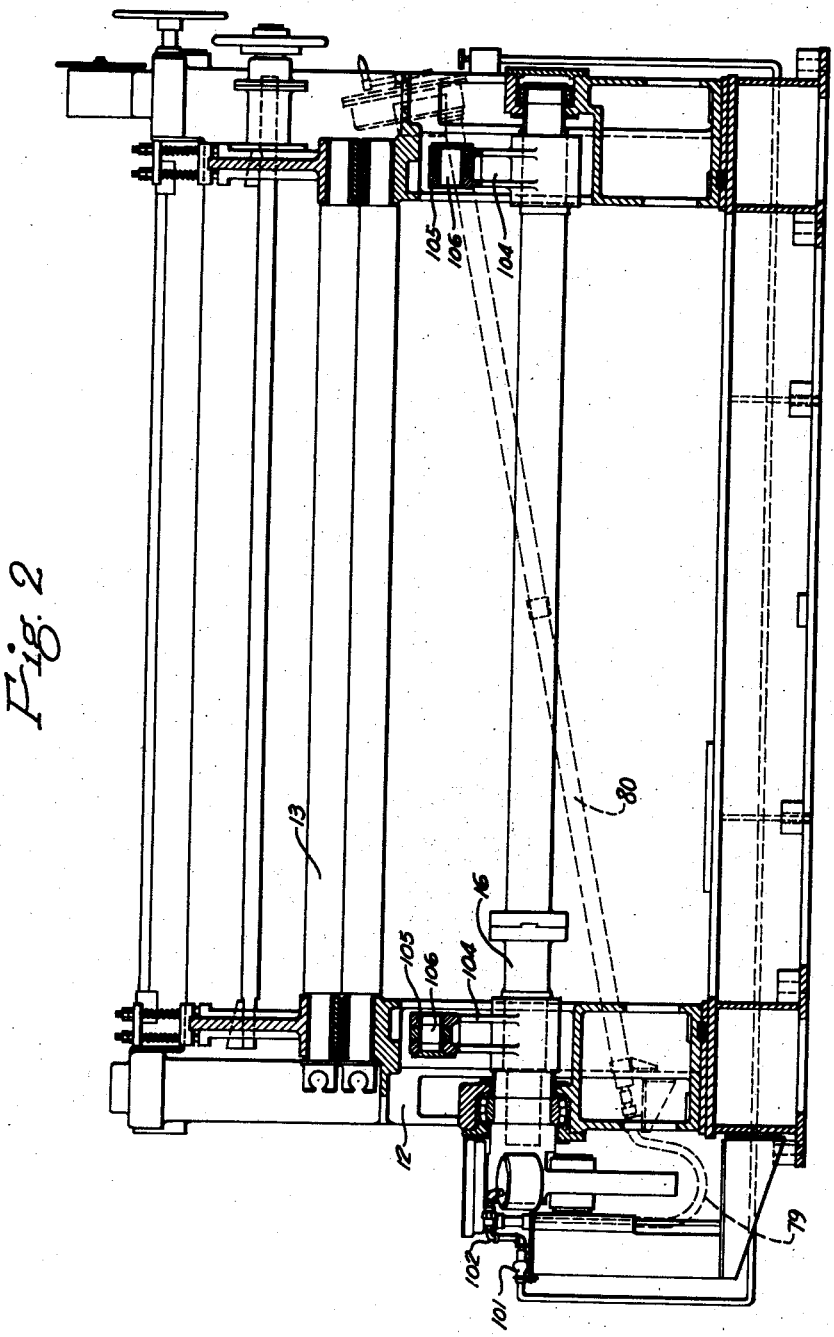
Figure 2 is a partial sectional end view of a leveler frame taken at II—II of Figure 1 showing
Figure 3:
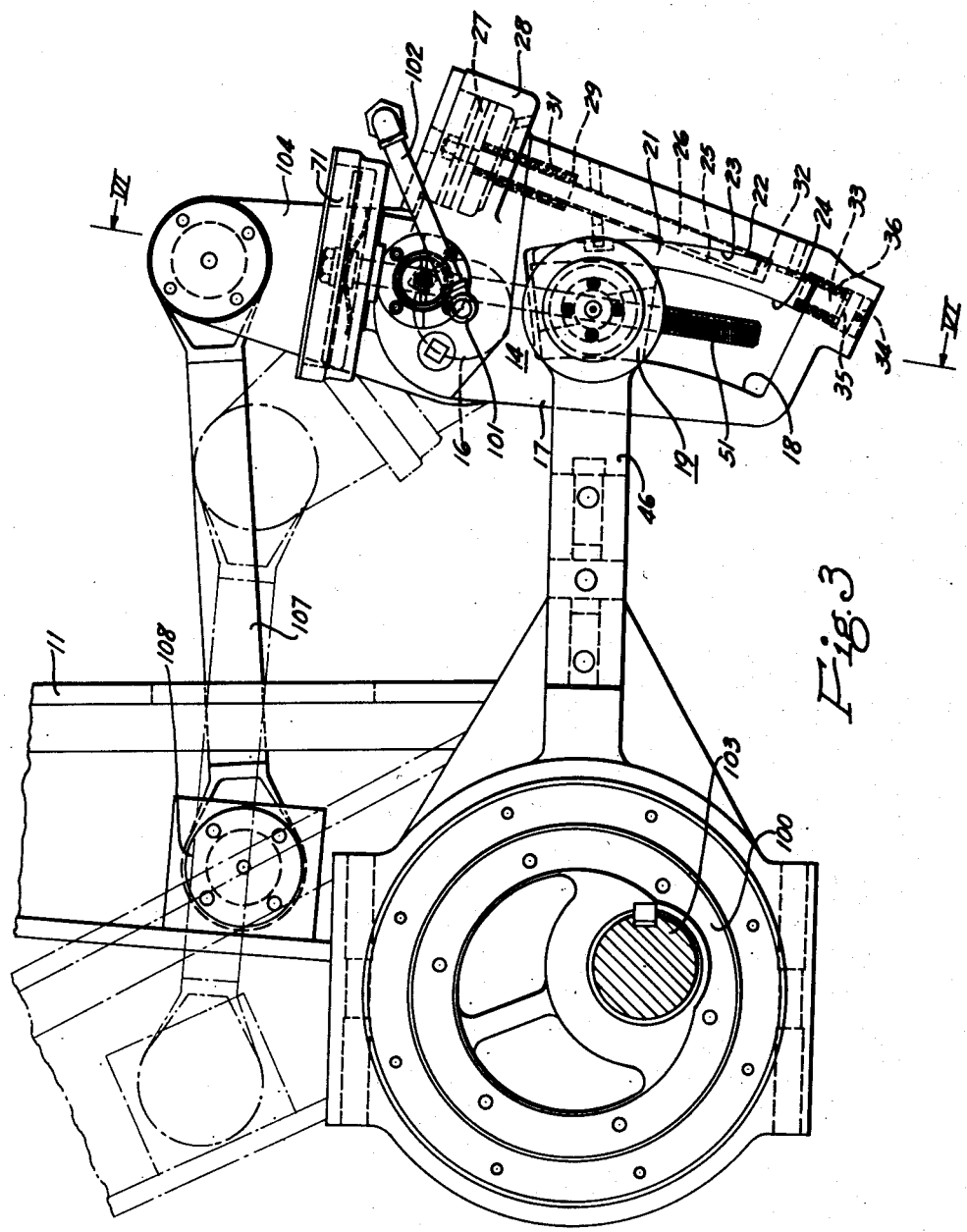
Figure 4:
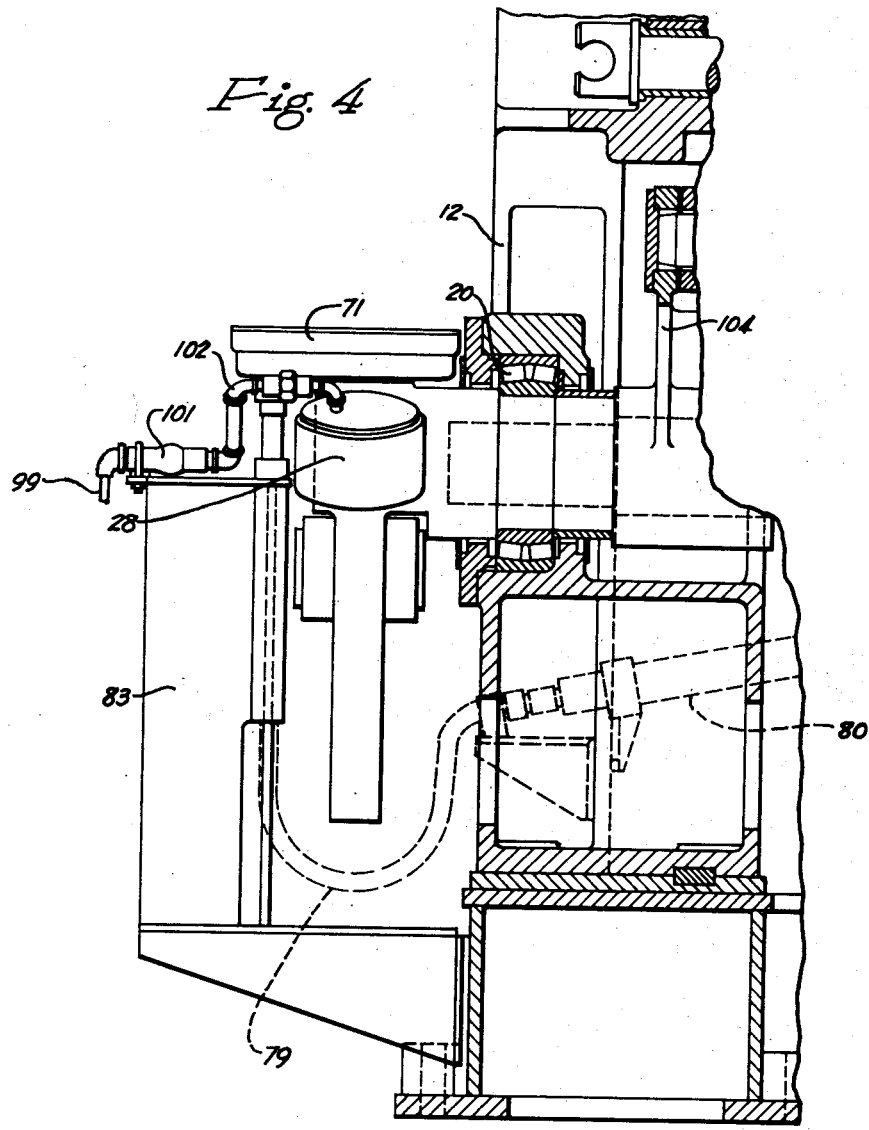
Figure 5:
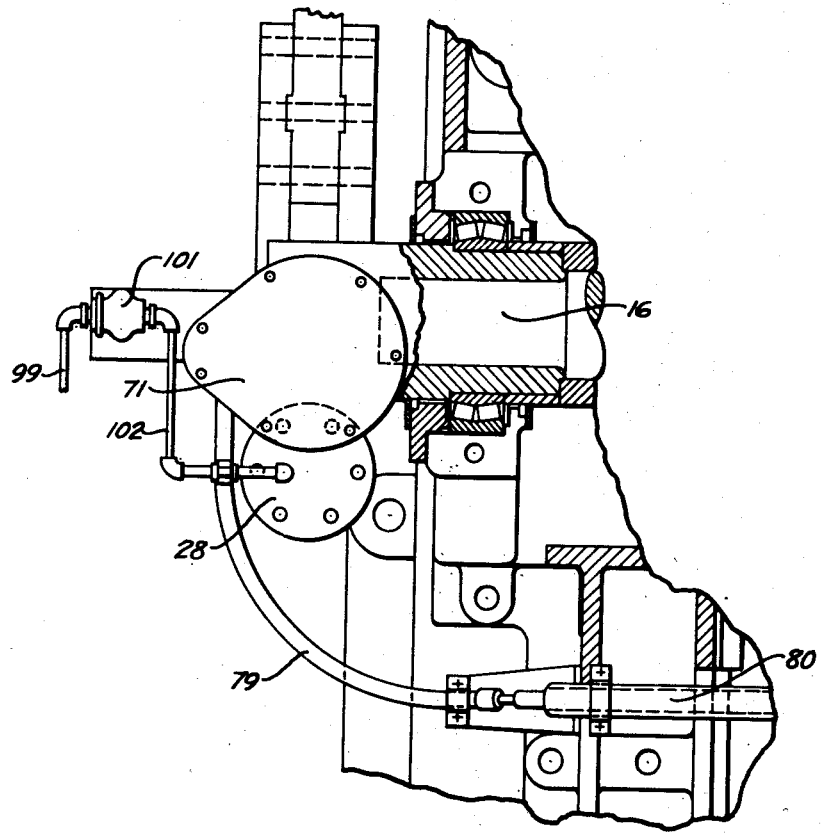
Figure 6:
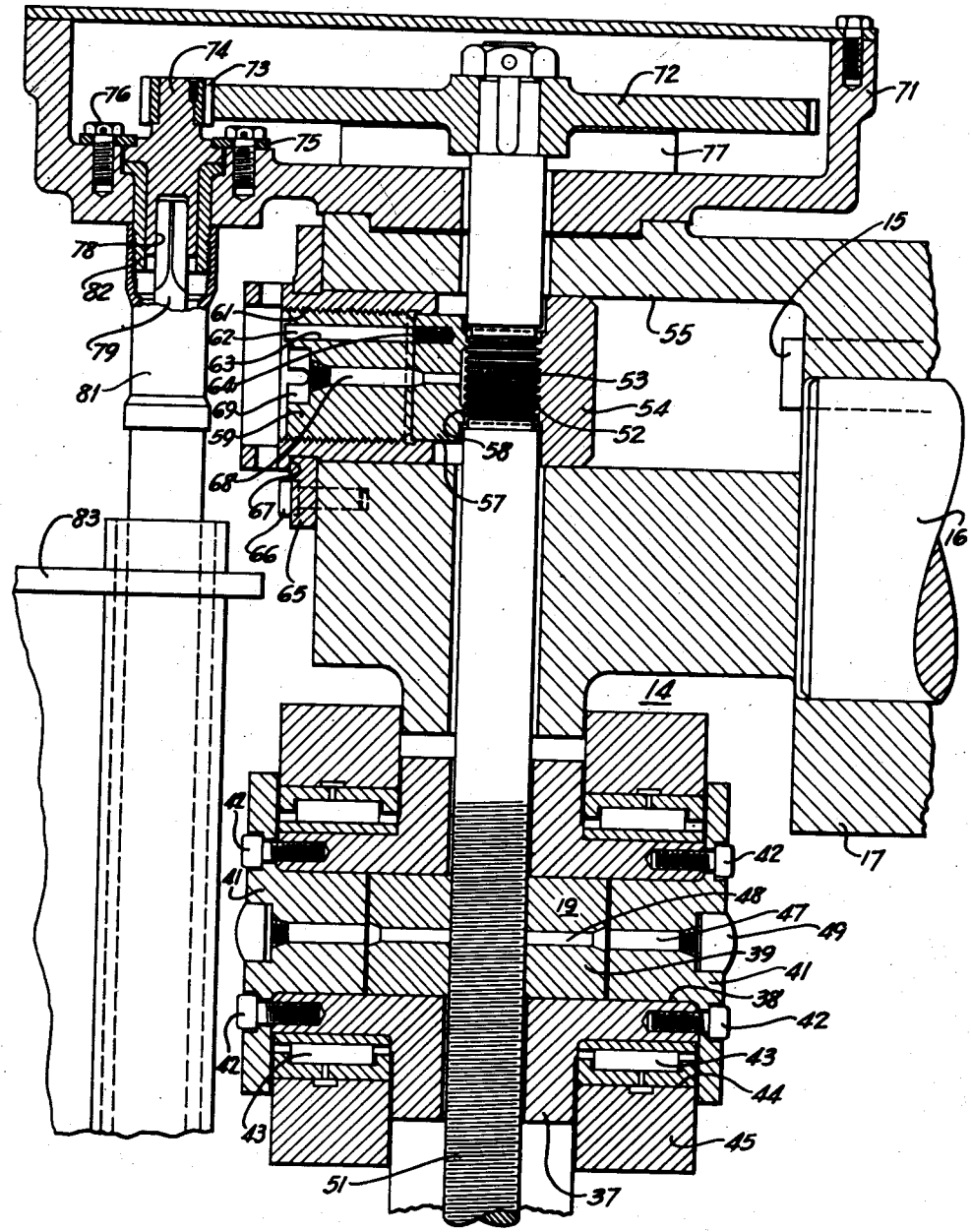

2 a portion of the shear speed control adjusting mechanism mounted thereon;

Figure 3 is an enlarged side elevation view of the speed synchronizing mechanism;

Figure 4 is an enlarged view of the speed control adjusting mechanism shown in Figure 2;

Figure 5 is an enlarged plan view of the speed control adjusting mechanism shown in Figure 4, and Figure 6 is a sectional view taken at VI—VI of Figure 3.

Figure 1:
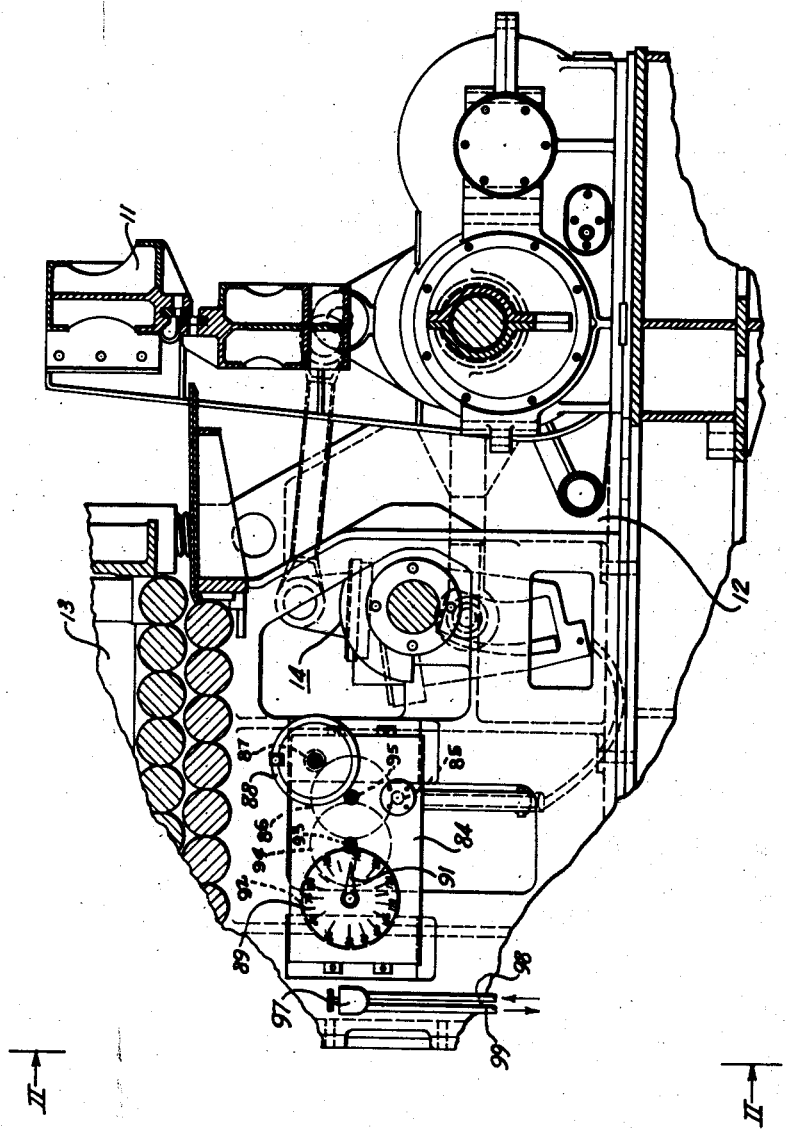
Figure 1 is a partial side elevation sectional view of a leveler together with a flying shear embodying the features of the invention herein disclosed.

With reference to Figures 1 and 2 of the drawings, there is shown in combination a driven reciprocatory flying shear 11 secured to the frame 12 of a driven roller leveler 13 adapted to feed strip material therefrom into and through the shear where the strip may be cut into any desired lengths.

Since the shear 11 herein illustrated is covered by the H. H. Talbot United States Patent Number 2,261,007 for a Reciprocating Flying Shear issued October 28, 1941, the complete description thereof has been omitted herein inasmuch as reference may be had to this patent for the construction and operating details thereof.

A synchronizing unit 14, for controlling the oscillations of the shear frame and for imposing upon the cutting elements thereof a longitudinal speed, during the interval a cut is being made, which is equivalent to the speed of the stock, is secured by means of a key 15 to a rocker shaft 16 mounted within suitable bearings 20 in the leveler frame 12.

The speed synchronizing unit 14, Figures 3 and 6, includes a body 17 at the lower portion of which is an opening 18 within which is received for slidable movement therein a sliding block assembly 19 and a movable wedge 21. The wedge 21 conforms on the one surface 22 thereof to the curve defined by the surface 23 of the opening 18 and on the opposite surface 24 thereof to the surface defined by the sliding block 19. Through the edge of the wedge 21 an opening 25 is provided within which is received the lower end of a piston rod 26 secured to a piston 27 contained within a cylinder 28 integral with and formed at the top of the body 17. Surrounding the piston rod 26 and contained within a recess 29 in the body 17 is a compression spring 31 adapted to urge the piston 27 upward into the inactive position thereof. The opening 25 in the wedge is a little larger than the diameter of the rod 26 to prevent binding when the piston rod end engages with the wedge and forces it downward. The clearance 32 between the normally inactive piston rod 26 and the bottom of the opening 29 is provided for permitting the rod 26 when forced downward to gain momentum before it strikes the wedge in order to effect a hammering action thereon.

Surrounding the rounded portion 33 of the bottom of the wedge and retained in position thereon by a pinned disc 34 and washer 35 is a compression spring 36 adapted yieldably to press the wedge 21 upward into the normal position thereof as shown in Figure 3.

With reference in particular to Figure 6, the sliding block assembly 19 comprises a slidable cylindrical block 37, having an opening 38 therethrough, within which is received a rotatable cylindrical nut 39 retained within the opening 38 by plugs 41 having screws 42 secured to the outer ends of the sliding block 37. Also retained on the sliding block 37 by means of the plugs 41 are two roller bearings 43 which engage the bored-out ends 44 of a clevis 45 formed at the end of a connecting rod 46. For admitting lubricant to the cylindrical nut 39, an opening 47 in each of the end plugs 41 communicates with an axially extending hole 48 provided in the nut. A suitable removable threaded sealing plug 49 is provided for each of the end plugs 41.

The sliding block assembly 19 may be adjusted to any desired position by a rotatable adjusting threaded shaft 51, the threads of which engage those of the cylindrical nut 39. Near the upper portion of the shaft 51 and for preventing axial movement thereof a series of circular grooves 52 are provided which match similar grooves 53 cut in a thrust block 54 received within an opening 55 of the body 17. Opposite the circular grooves 52 of the thrust block 54 is an insert 57 having a pair of projections 58 thereon received within a pair of the grooves of the adjusting threaded shaft. The thrust block 54 and the insert 57 are retained in position by a set screw 59 engaging the threaded opening 61 of the thrust block. An extended threaded screw 62 is passed through the opening 63 of the set screw and engaged with the threads 64 of the insert 57 thereby locking the set screw in position. A pair of half collars 65, secured to the body 17 by screws 66, is received within a groove 67 on the periphery of the thrust block and assist in maintaining the block assembly in proper relationship with respect to the adjusting shaft. A passage 68, normally closed by a sealing plug 69, is provided in the set screw 59 and insert 57 through which a lubricant may be admitted to the grooves 52.

A gear box 71 secured to the top of the body 17 contains therein a main gear 72 secured to the end of the adjusting screw and in mesh with a driving pinion 73 secured to a hub 74 retained in the gear box by a retaining ring 75 fastened to the box by screws 76. Beneath the gear 72 is a flexible spring plate 77 adapted to be deflected for permitting the adjusting screw to be tilted as the sliding block assembly 19 is adjusted along the opening 18. The teeth of the gear 72 and pinion 73 are so formed as to prevent binding thereof when the planes in which the gears lie do not coincide.

The lower end of the hub 74 is provided with a square opening 78 within which is received a square ended flexible shaft 79. The flexible shaft 79 passes through a housing 81 which is screwed on to the threaded end of a bushing 82 mounted in the gear box and adequately supported by a guide bracket 83 secured to the leveler frame.

From the gear box 71, the flexible shaft extends through a shielding conduit 80 to the operator's side of the leveler where the end thereof passes into a second gear box 84 in which it is secured to a pinion 85. The pinion 85 is driven through a train of gears consisting of an idler gear 86 meshing therewith and with a pinion 87 rotated by means of a hand wheel 88 keyed to the shaft thereof. Also secured to the gear box 84 is a scale 89 calibrated to indicate the lengths into which the strip is being cut by the shear 11. The indicating hand 91 thereof is rotated by a gear 92 which meshes with a pinion 93 keyed to the same shaft as a gear 94 which, in turn, is in mesh with and driven by a pinion 95 secured to the shaft of the idler gear 86.

The system for admitting fluid under pressure to the cylinder 28, as shown on Figures 1 and 4, consists of a three-way valve 97 mounted on the operator's side of the leveler to which are connected a pipe 98 extending from a high pressure fluid source, not shown, and a pipe 99 connected to a swing joint fitting 101 which, in turn, is connected through piping 102 to the top of the cylinder 28.

The connecting rod 46, as best shown on Figure 3, is provided with an eccentric 109 keyed to the one end of the shear main drive shaft 103 which is supported by and passed through the frame of the shear. On the rocker shaft 16 are keyed two levers 104 provided with suitable bearings 105 at the clevised ends thereof within which are received pins 106 for securing thereto the one end of a pair of links 107. The opposite ends of the links 107 are secured in suitable bearings 108 to the frame of the shear 11. As the shaft 103 is rotated the synchronizing unit 14 secured to the rocker shaft 16 is caused to oscillate whereby through the levers and links an oscillatory motion is imposed upon the shear 11. Whether the shear will be caused to oscillate slowly or rapidly will depend upon the center distance between the rocker shaft 16 and the sliding block assembly 19.

In order to adjust the sliding block assembly 19 to the desired position for cutting the lengths of strip desired, it is unnecessary to stop the shear or interfere with the passage of the strip therethrough. The operator merely opens the three-way valve 97 to admit fluid under pressure to the cylinder 28 whereby the wedge 21 is forced downward and out of position to provide the necessary clearance for adjusting the sliding block assembly 19. As soon as the handwheel has been rotated sufficiently to bring the sliding block assembly 19 into the desired position, which will be indicated by the scale 89, the three-way valve 97 is opened to the exhaust and immediately the wedge 21, by the action of the compression spring 36 at the bottom thereof, is forced upward into the locking position. In accordance with H. H. Talbot Patent No. 2,261,007 mentioned hereinbefore, the speed of the shear drive shaft is, however, first modified to provide the proper number of shear frame oscillations which may be required for cutting the strip into the lengths desired. For example, if the miscut mechanism provided for in this patent is not employed, then for each oscillation of the shear a cut will be made. If the speed of the strip is two hundred fifty feet per minute and the operator desires to cut the strip into twenty-five foot lengths, then the speed of the shear drive will be modified to provide for ten shear frame oscillations per minute and the sliding block adjusted to a position at which the dial reading is twenty-five feet.

If the shear miscut mechanism is employed, the length of the pieces severed from the continuous strip will be a multiple of the length as indicated upon the dial 89, being dependent upon the number of shear frame oscillations between cuts.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In a reciprocating flying shear having a drive shaft therefor, a stroke adjusting device associated with and for varying the magnitude of the stroke of said shear comprising a rocker shaft, an eccentric mounted on said drive shaft, a member having a slot therein secured to said rocker shaft, a slidable block secured to said frame and positioned within said slotted member, means adapted to be adjusted from a remote position during operation of said shear for changing the relative position of said block within said slotted member, locking means comprising a slidable wedge normally urged into contact with and for holding said block in a given desired position within said slotted member, and means adapted to engage with and release said wedge from contact with and during adjustment of said slidable block.

2. In a reciprocating flying shear having a drive shaft therefor, a stroke modifying device associated with said shear for varying the magnitude of the stroke thereof comprising a rocker shaft, an eccentric mounted on said drive shaft, a member secured to said rocker shaft having a curved diverging slot therein, a curved slidable block attached to said eccentric positioned within said slot and conforming substantially to the curvature of the slot on the side with which contact is made, a curved slidable locking wedge positioned within said slotted member conforming on one side thereof to the curvature of the slot on the side with which contact is made and on the opposite side thereof to the curvature of the side of said block, constant pressure means normally urging said wedge into contact with said member and said block, remotely operable adjusting means secured to said block for changing the relative position of said block within said slot and means adapted to engage with and release said wedge from contact with and during adjustment of said slidable block.

FLORENCE C. BIGGERT, JR.

References Cited in the file of this patent

UNITED STATES PATENTS

| Number | Name | Date |
|---|---|---|
| 1,505,711 | Johnson | Aug. 19, 1924 |
| 1,883,025 | Smith | Oct. 18, 1932 |
| 1,973,515 | Talbot | Sept. 11, 1934 |
| 1,996,617 | Hahn | Apr. 2, 1935 |
| 2,261,007 | Talbot | Oct. 28, 1941 |